US010251092B1

(12) United States Patent
Tripathi (10) Patent No.: US 10,251,092 B1
(45) Date of Patent: Apr. 2, 2019

(54) SIGNALING MESSAGE REDUCTION FOR NETWORK SESSION TEARDOWN AND NETWORK TUNNEL TEARDOWN

(71) Applicant: Juniper Networks, Inc., Sunnyvale, CA (US)

(72) Inventor: Vinay Kumar Tripathi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 223 days.

(21) Appl. No.: 14/865,819

(22) Filed: Sep. 25, 2015

(51) Int. Cl.
*H04L 29/06* (2006.01)
*H04W 28/12* (2009.01)
*H04W 76/32* (2018.01)
*H04L 12/911* (2013.01)

(52) U.S. Cl.
CPC ............. *H04W 28/12* (2013.01); *H04L 29/06* (2013.01); *H04L 47/825* (2013.01); *H04W 76/32* (2018.02)

(58) Field of Classification Search
CPC .... H04W 28/12; H04W 76/062; H04L 29/06; H04L 47/825
See application file for complete search history.

(56) References Cited

U.S. PATENT DOCUMENTS

| 2002/0116501 | A1* | 8/2002 | Ho | H04L 12/4633 709/227 |
| 2003/0224792 | A1* | 12/2003 | Verma | H04L 29/06 455/436 |
| 2006/0171365 | A1* | 8/2006 | Borella | H04L 12/4633 370/338 |
| 2006/0182019 | A1* | 8/2006 | Karlsson | H04L 12/4633 370/216 |
| 2008/0123604 | A1* | 5/2008 | Shimizu | H04L 12/4633 370/338 |
| 2009/0040961 | A1* | 2/2009 | Ue | H04L 12/4633 370/315 |
| 2010/0302932 | A1* | 12/2010 | Himeno | H04L 45/28 370/216 |

OTHER PUBLICATIONS

RFC 3931 Layer Two Tunneling Protocol—Version 3 (L2TPv3) Mar. 2005 Lau et al.*

* cited by examiner

*Primary Examiner* — Jeffrey M Rutkowski
*Assistant Examiner* — Basil Ma
(74) *Attorney, Agent, or Firm* — Harrity & Harrity, LLP (57) ABSTRACT

A device may include one or more processors. The one or more processors may identify a set of network tunnels or network sessions for which a teardown is to be performed. The set of network tunnels or network sessions may be associated with a set of identifiers. The one or more processors may generate a signaling message associated with causing the teardown to be performed on the set of network tunnels or network sessions. The signaling message may include two or more identifiers of the set of identifiers. The one or more processors may transmit the signaling message to cause the teardown to be performed on two or more network tunnels or network sessions, of the set of network tunnels or network sessions, corresponding to the two or more identifiers.

20 Claims, 7 Drawing Sheets

SIGNALING MESSAGE REDUCTION FOR NETWORK SESSION TEARDOWN AND NETWORK TUNNEL TEARDOWN

BACKGROUND

A tunneling protocol, such as a layer 2 tunneling protocol (L2TP), may be utilized for communication. For example, an access concentrator (e.g., an L2TP access concentrator (LAC)) and a network server (e.g., an L2TP network server (LNS)) may utilize L2TP when establishing and/or performing teardown for a network tunnel and/or a network session. During a mass logout scenario, such as a network connectivity outage, the access concentrator and/or the network server may perform teardowns for multiple network tunnels and/or multiple network sessions within a threshold period of time.

SUMMARY

According to some possible implementations, a device may include one or more processors. The one or more processors may identify a set of network tunnels or network sessions for which a teardown is to be performed. The set of network tunnels or network sessions may be associated with a set of identifiers. The one or more processors may generate a signaling message associated with causing the teardown to be performed on the set of network tunnels or network sessions. The signaling message may include two or more identifiers of the set of identifiers. The one or more processors may transmit the signaling message to cause the teardown to be performed on two or more network tunnels or network sessions, of the set of network tunnels or network sessions, corresponding to the two or more identifiers.

According to some possible implementations, a computer-readable medium may store one or more instructions that, when executed by one or more processors, may cause the one or more processors to establish a plurality of network tunnels, including a corresponding plurality of network sessions, associated with routing network traffic. The one or more instructions, when executed by the one or more processors, may cause the one or more processors to receive a trigger to perform a teardown of the plurality of network tunnels and the corresponding plurality of network sessions. The one or more instructions, when executed by the one or more processors, may cause the one or more processors to generate a single signaling message associated with causing a network session teardown of the plurality of network sessions based on receiving the trigger to perform the teardown of the plurality of network tunnels and the corresponding plurality of network sessions. The signaling message may identify each network session of the plurality of network sessions. The one or more instructions, when executed by the one or more processors, may cause the one or more processors to transmit the signaling message to cause the network session teardown of the plurality of network sessions.

According to some possible implementations, a method may include generating, by a device, a single layer 2 tunneling protocol (L2TP) signaling message associated with causing at least one of a plurality of network tunnel teardowns for a plurality of network tunnels, or a plurality of network session teardowns for a plurality of network sessions. The single L2TP signaling message may identify the plurality of network tunnels and/or the plurality of network sessions. The method may include transmitting, by the device, the single L2TP signaling message to cause at least one of the plurality of network tunnel teardowns or the plurality of network session teardowns.

DETAILED DESCRIPTION

The following detailed description of example implementations refers to the accompanying drawings. The same reference numbers in different drawings may identify the same or similar elements.

An access concentrator and/or a network server may establish a network session and/or a network tunnel. For example, a layer 2 tunneling protocol (L2TP) access concentrator (LAC) may establish an L2TP network tunnel and an L2TP network session with an L2TP network server (LNS) as a communications path for directing communications between a client device and the LNS. After a period of time, the access concentrator and/or the network server may receive a trigger to perform teardown of the network session and/or the network tunnel. The access concentrator and the network server may exchange a set of messages to perform the teardown of the network session and/or the network tunnel. For example, the LAC may transmit an L2TP message to the LNS identifying an L2TP network session for teardown, the LNS may perform a teardown of the L2TP network session, and the LNS may transmit an acknowledgement message confirming the L2TP network session for which the teardown was performed. Similarly, the LNS may transmit an L2TP message to the LAC identifying an L2TP network tunnel for teardown, the LAC may perform the teardown of the L2TP network tunnel, and the LAC may transmit an acknowledgement message confirming the L2TP network tunnel for which the teardown was performed.

The network server may experience performance degradation, unreliable performance, or the like when the quantity of packets (e.g., packets associated with teardown messages), which are directed to the network server for processing and/or acknowledgement or which are generated by the network server for transmission to the access concentrator, exceeds a threshold. For example, after a service interruption resulting in multiple client devices being disconnected from the network server, the network server may be caused to exchange messages with the access concentrator to perform multiple network session teardowns and/or network tunnel teardowns for the multiple client devices, concurrently. Implementations, described herein, may reduce a likelihood that the quantity of messages exceeds a threshold, thereby reducing a likelihood that the network server experiences degraded performance from excessive packet processing, packet generation, and/or acknowledgement message generation.

Figure 1:
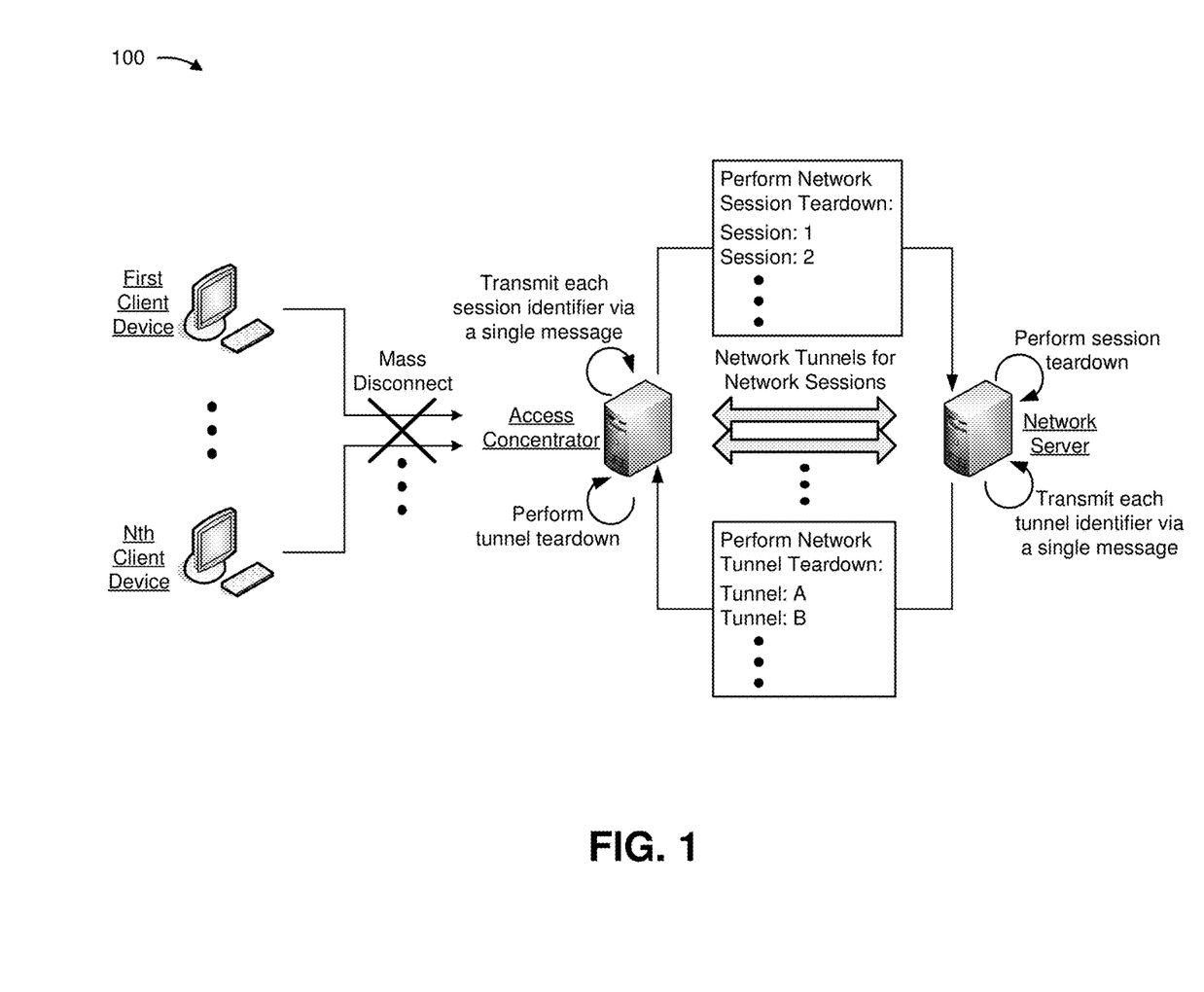
FIG. 1 is a diagram of an overview of an example implementation described herein.

FIG. 1 is a diagram of an overview of an example implementation 100 described herein. As shown in FIG. 1, example implementation 100 includes a set of client devices (e.g., a first client device, an nth client device, etc.), an access concentrator (e.g., a LAC), and a network server (e.g., an LNS). The network server and the access concentrator may utilize a set of network sessions and a corresponding set of network tunnels for directing network traffic relating to the set of client devices. For example, a particular client device, of the set of client devices, may be associated with a particular network session, of the set of network sessions, and a particular network tunnel, of the set of network tunnels. In this case, the access concentrator may receive network traffic from the particular client device and direct the network traffic to the network server via the particular network tunnel and the particular network session. Similarly, the access concentrator may receive network traffic from the network server via the particular network tunnel and the particular network session and may direct the network traffic to the particular client device.

As further shown in FIG. 1, the set of client devices may experience a mass disconnect scenario. For example, a service interruption may result in the set of client devices being disconnected from the network server. The access concentrator may detect the service interruption, and may trigger a teardown for the set of network sessions and/or the set of network tunnels. The access concentrator may determine a set of session identifiers for the set of network sessions. The access concentrator may transmit a message, which includes the set of session identifiers for the set of network sessions, to the network server to cause the network server to perform the teardown of the set of network sessions. For example, the access concentrator may generate a single L2TP signaling message including an attribute-value pair (AVP) identifying the set of session identifiers. The AVP may include an attribute portion that indicates that the value portion includes one or more session identifiers. The AVP may include a corresponding value portion that includes the set of session identifiers. The network server may receive the message, and may perform the teardown on the set of network sessions based on the session identifiers included in the message identifying the set of network sessions. In this way, the access concentrator may consolidate multiple messages identifying multiple network sessions for teardown into a single message, thereby reducing a likelihood of overloading the network server relative to the network server receiving multiple messages.

As further shown in FIG. 1, based on performing network session teardown, the network server may determine a set of tunnel identifiers for the set of network tunnels. The network server may transmit a message, which includes the set of tunnel identifiers for the set of network tunnels, to the access concentrator to cause the access concentrator to perform the teardown of the set of network tunnels. For example, the network server may generate a single L2TP signaling message including an AVP identifying the set of network tunnels. The AVP may include an attribute portion indicating that an associated value portion includes one or more tunnel identifiers. The AVP may include a value portion identifying the set of tunnel identifiers. The access concentrator may receive the message, and may perform the teardown on the set of network tunnels based on the set of tunnel identifiers included in the message. In this way, a network server may consolidate multiple messages identifying multiple network tunnels for teardown into a single message, thereby reducing a likelihood that of overloading the network server relative to the network server providing multiple messages.

Figure 2:
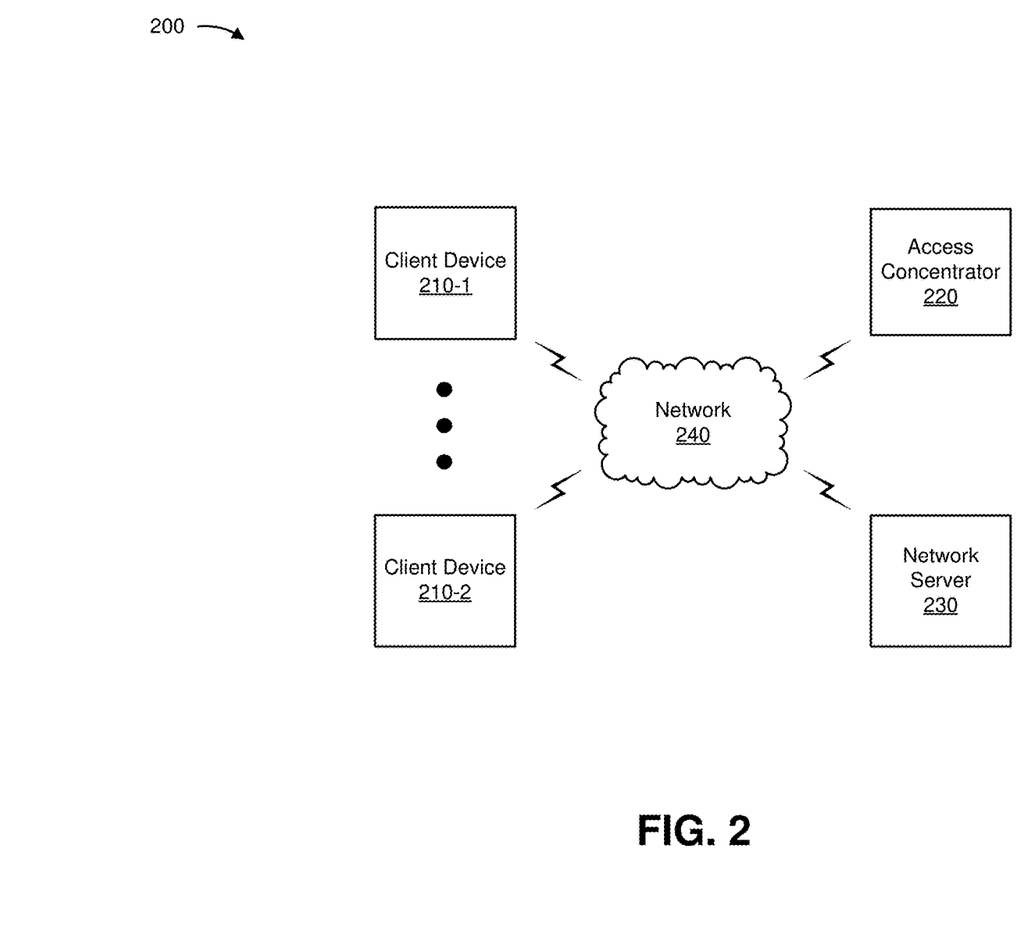
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more client devices 210-1 through 210-N (N≥1) (hereinafter referred to collectively as "client devices 210," and individually as "client device 210"), an access concentrator 220, a network server 230, and a network 240. Devices of environment 200 may interconnect via wired connections, wireless connections, or a combination of wired and wireless connections.

Client device 210 may include one or more devices capable of receiving, generating, storing, processing, and/or providing information via a network connection. For example, client device 210 may include a communications device, such as a mobile phone (e.g., a smart phone, a radiotelephone, etc.), a laptop computer, a tablet computer, a handheld computer, a gaming device, a set-top box, a wearable communication device (e.g., a smart wristwatch, a pair of smart eyeglasses, etc.), or a similar type of device. In some implementations, client device 210 may utilize a network session and/or a network tunnel to communicate with network server 230 (e.g., via access concentrator 220), such as an L2TP network session and/or an L2TP network tunnel or the like. In some implementations, client device 210 may receive information from and/or transmit information to another device in environment 200.

Access concentrator 220 may include one or more devices capable of storing, processing, and/or routing information. For example, access concentrator 220 may include a traffic transfer device, such as a gateway, a router, a modem, a switch, a firewall, a network interface card (NIC), a hub, a bridge, a server device, or any other type of device that processes and/or transfers traffic. In some implementations, access concentrator 220 may include an endpoint device of a network tunnel. For example, access concentrator 220 may include a LAC for an L2TP network tunnel. In some implementations, access concentrator 220 may include a communication interface that allows access concentrator 220 to receive information from and/or transmit information to other devices in environment 200.

Network server 230 may include one or more devices capable of storing, processing, and/or routing information. For example, network server 230 may include a server device that is capable of receiving and/or processing a threshold quantity of teardown messages (e.g., network session teardown messages, network tunnel teardown messages, etc.) without experiencing performance degradation. In some implementations, network server 230 may include an endpoint device of a network tunnel. For example, network server 230 may include an LNS for an L2TP network tunnel. In some implementations, network server 230 may include a communication interface that allows network server 230 to receive information from and/or transmit information to other devices in environment 200.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
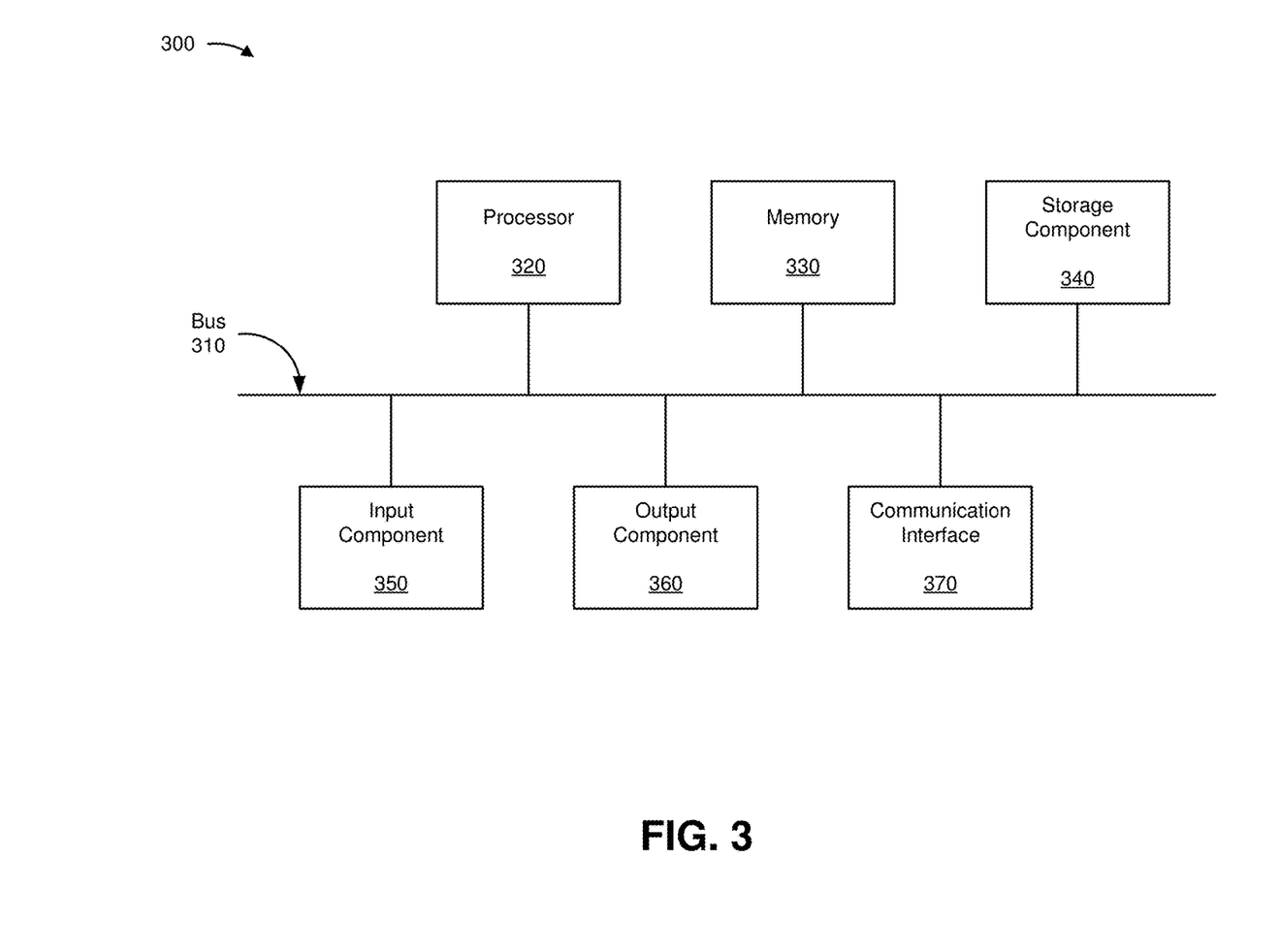
FIG. 3 is a diagram of example components of one or more devices of FIG. 2.

FIG. 3 is a diagram of example components of a device 300. Device 300 may correspond to client device 210, access concentrator 220, and/or network server 230. In some implementations, client device 210, access concentrator 220, and/or network server 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
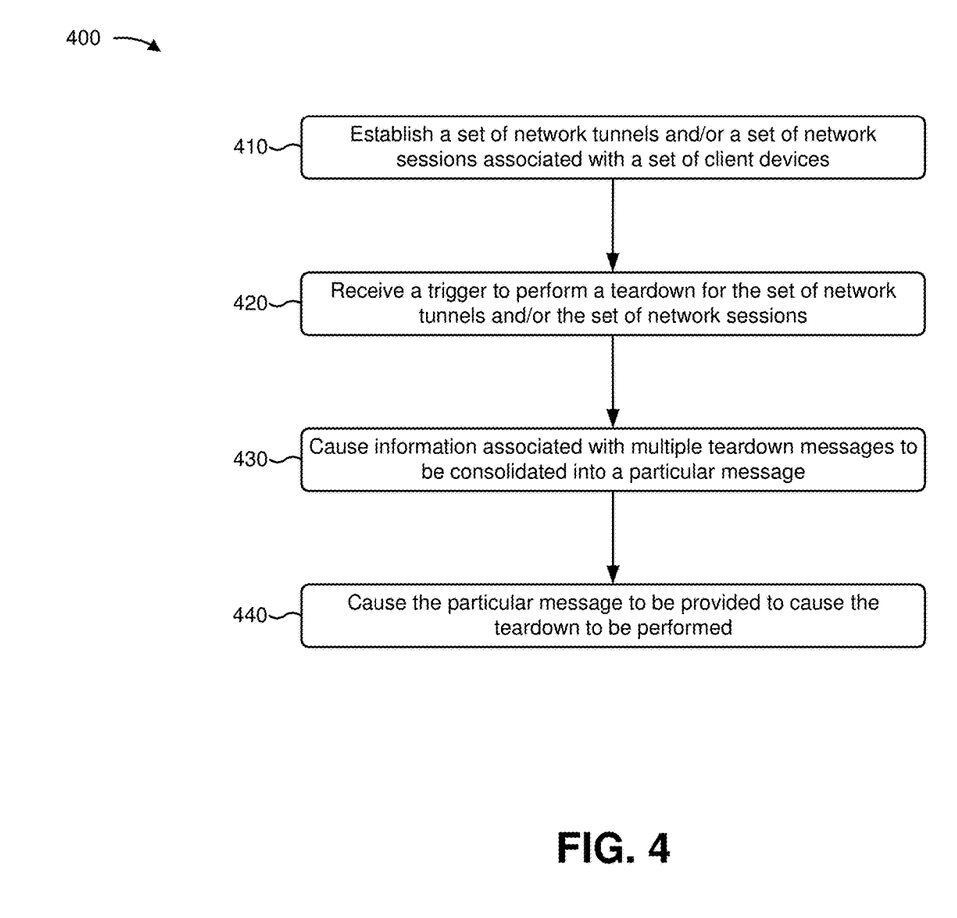
FIG. 4 is a flow chart of an example process for consolidating teardown messages for multiple network session and/or network tunnel teardowns.

FIG. 4 is a flow chart of an example process 400 for consolidating teardown messages for multiple network session and/or network tunnel teardowns. In some implementations, one or more process blocks of FIG. 4 may be performed by access concentrator 220. In some implementations, one or more process blocks of FIG. 4 may be performed by another device or a group of devices separate from or including access concentrator 220, such as client device 210 and network server 230.

As shown in FIG. 4, process 400 may include establishing a set of network tunnels and/or a set of network sessions associated with a set of client devices (block 410). For example, access concentrator 220 may establish the set of network tunnels and/or the set of network sessions for the set of client devices 210. In some implementations, access concentrator 220 may transmit one or more messages to network server 230 to establish the set of network tunnels (e.g., two or more network tunnels) and/or the set of network sessions (e.g., two or more network sessions). For example, access concentrator 220 may receive a set of connection requests (e.g., a set of network tunnel connection requests, a set of network session connection requests, or the like) from the set of client devices 210, and may transmit the set of connection requests to network server 230 for processing. In this case, network server 230 may establish the set of network tunnels and/or the set of network sessions based on receiving the set of connection requests (e.g., network server 230 may generate and provide routing information, allocate network resources, allocate computing resources, or the like to establish the set of network tunnels and/or the set of network sessions).

In some implementations, access concentrator 220 may exchange one or more messages with network server 230 to establish the set of network tunnels and/or the set of network sessions. For example, access concentrator 220 may provide a set of L2TP signaling messages to network server 230, and may cause network server 230 to establish the set of network tunnels and/or the set of network sessions. Additionally, or alternatively, access concentrator 220 may receive a set of L2TP signaling messages from network server 230, and may establish the set of network tunnels and/or the set of network sessions based on receiving the set of L2TP signaling messages.

As further shown in FIG. 4, process 400 may include receiving a trigger to perform a teardown for the set of network tunnels and/or the set of network sessions (block 420). For example, access concentrator 220 may receive the trigger to perform the teardown for the set of network tunnels and/or the set of network sessions. In some implementations, access concentrator 220 may receive the trigger to perform the teardown from the set of client devices 210. For example, the set of client devices 210 may detect a service interruption associated with network server 230, and may transmit a set of messages, to access concentrator 220, indicating that the set of network tunnels and/or the set of network sessions are to be disconnected based on detecting the service interruption.

Additionally, or alternatively, access concentrator 220 may receive the trigger to perform the teardown based on detecting a trigger. For example, access concentrator 220 may detect a service interruption associated with network server 230, and may determine to perform the teardown for the set of network tunnels and/or the set of network sessions based on detecting the service interruption.

Additionally, or alternatively, access concentrator 220 may receive the trigger to perform the teardown from network server 230. For example, network server 230 may transmit a message, to access concentrator 220, associated with causing access concentrator 220 to perform the teardown on the set of network tunnels and/or the set of network sessions. In some implementations, network server 230 may transmit the message to access concentrator 220 based on detecting a service interruption. For example, network server 230 may determine that communication with the set of client devices 210 has been terminated, and may transmit the message to access concentrator 220 to trigger the teardown. In some implementations, network server 230 may transmit the message to access concentrator 220 based on performing a portion of the teardown. For example, when access concentrator 220 causes network server 230 to teardown a network session, network server 230 may transmit a message to access concentrator 220 to cause access concentrator 220 to teardown a network tunnel associated with the network session.

As further shown in FIG. 4, process 400 may include causing information associated with multiple teardown messages to be consolidated into a particular message (block 430). For example, access concentrator 220 may cause information associated with multiple messages (e.g., signaling messages intended to cause the teardown to be performed) to be consolidated into a particular message. In some implementations, access concentrator 220 may consolidate multiple messages into a single message. For example, access concentrator 220 may consolidate a set of session identifiers (e.g., two or more session identifiers) corresponding to the set of network sessions into an AVP of a single L2TP signaling message. Additionally, or alternatively, access concentrator 220 may cause network server 230 to consolidate multiple acknowledgement messages into a single acknowledgement message. For example, based on transmitting the L2TP signaling message with the AVP, which includes the set of session identifiers, access concentrator 220 may cause network server 230 to generate a single L2TP acknowledgement message with an AVP that includes the set of session identifiers. In this way, access concentrator 220 reduces a quantity of messages associated with causing a teardown of multiple network sessions relative to access concentrator 220 identifying each network session via a corresponding message.

In some implementations, access concentrator 220 may cause network server 230 to consolidate multiple messages into a single message. For example, based on access concentrator 220 causing network server 230 to perform a network session teardown, access concentrator 220 may cause network server 230 to consolidate a set of tunnel identifiers (e.g., two or more tunnel identifiers) corresponding to the set of network tunnels into an AVP of a single L2TP signaling message. Additionally, or alternatively, access concentrator 220 may consolidate multiple acknowledgement messages into a single message. For example, based on receiving the single L2TP signaling message with the AVP, which includes the set of tunnel identifiers, access concentrator 220 may generate a single L2TP acknowledgement message with an AVP that includes the set of tunnel identifiers. In this way, access concentrator 220 causes network server 230 to reduce a quantity of messages associated with causing a teardown of multiple network tunnels relative to network server 230 identifying each network tunnel via a corresponding message.

In some implementations, access concentrator 220 may cause network server 230 to consolidate multiple messages into a threshold quantity of messages. For example, access concentrator 220 may cause network server 230 to consolidate the set of tunnel identifiers into a particular quantity of L2TP messages that is less than the quantity of tunnel identifiers in the set of tunnel identifiers. In this case, the particular quantity of L2TP messages may be determined based on a message processing capability of the network server 230. In other words, the particular quantity of L2TP messages may be selected to reduce a likelihood that network server 230 experiences performance degradation relative to transmitting the set of tunnel identifiers via a corresponding set of L2TP messages. Similarly, access concentrator 220 may consolidate multiple messages into a threshold quantity of messages based on a message processing capability of network server 230.

As further shown in FIG. 4, process 400 may include causing the particular message to be provided to cause the teardown to be performed (block 440). For example, access concentrator 220 may cause the particular message to be provided to cause the teardown to be performed. In some implementations, access concentrator 220 may provide the particular message to cause the teardown to be performed. For example, access concentrator 220 may provide an L2TP signaling message with an AVP including the set of session identifiers to cause network server 230 to perform a network session teardown for the set of network sessions. In this case, network server 230 may perform the network session teardown for the set of network sessions, and may provide an acknowledgement message. For example, network server 230 may provide a single L2TP acknowledgement message with an AVP including the set of session identifiers to confirm the network session teardown of the set of network sessions. In this way, access concentrator 220 and/or network server 230 reduce a likelihood that network server 230 is overloaded by processing, generating, and/or acknowledging messages relative to utilizing a set of messages for each network session for which teardown is to be performed.

In some implementations, access concentrator 220 may receive the particular message, and may perform the teardown. For example, based on network server 230 performing the network session teardown, network server 230 may provide an L2TP signaling message with an AVP including the set of tunnel identifiers to cause access concentrator 220 to perform a network tunnel teardown for the set of network tunnels. In this case, access concentrator 220 may perform the network tunnel teardown for the set of network tunnels, and may provide an acknowledgement message. For example, access concentrator 220 may provide a single L2TP acknowledgement message with an AVP including the set of tunnel identifiers to confirm the network tunnel teardown of the set of network tunnels. In this way, access concentrator 220 and/or network server 230 reduce a likelihood that network server 230 is overloaded by processing, generating, and/or acknowledging messages relative to utilizing a set of messages for each network tunnel for which teardown is to be performed.

In some implementations, access concentrator 220 may cause the teardown to be performed in a particular order based on the particular message. For example, access concentrator 220 may provide the particular message with the set of session identifiers in a particular order, and may cause network server 230 to perform network session teardown of the set of network sessions based on the particular order of the set of session identifiers. Similarly, access concentrator 220 may receive the particular message with the set of tunnel identifiers in a particular order, and may perform network tunnel teardown of a set of network tunnels in the particular order.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
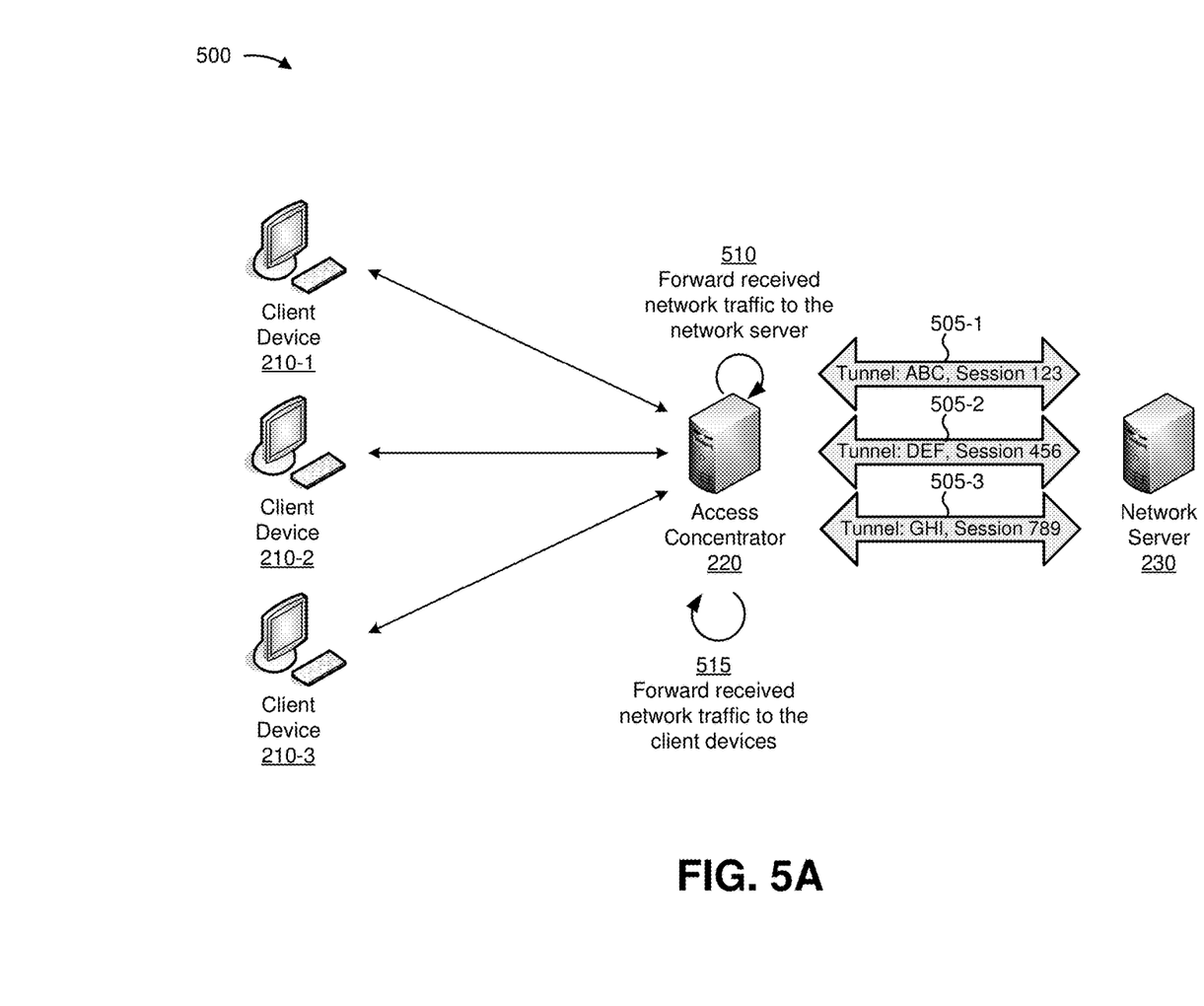
FIGS. 5A-5C are diagrams of an example implementation relating to the example process shown in FIG. 4.
Figure 5B:
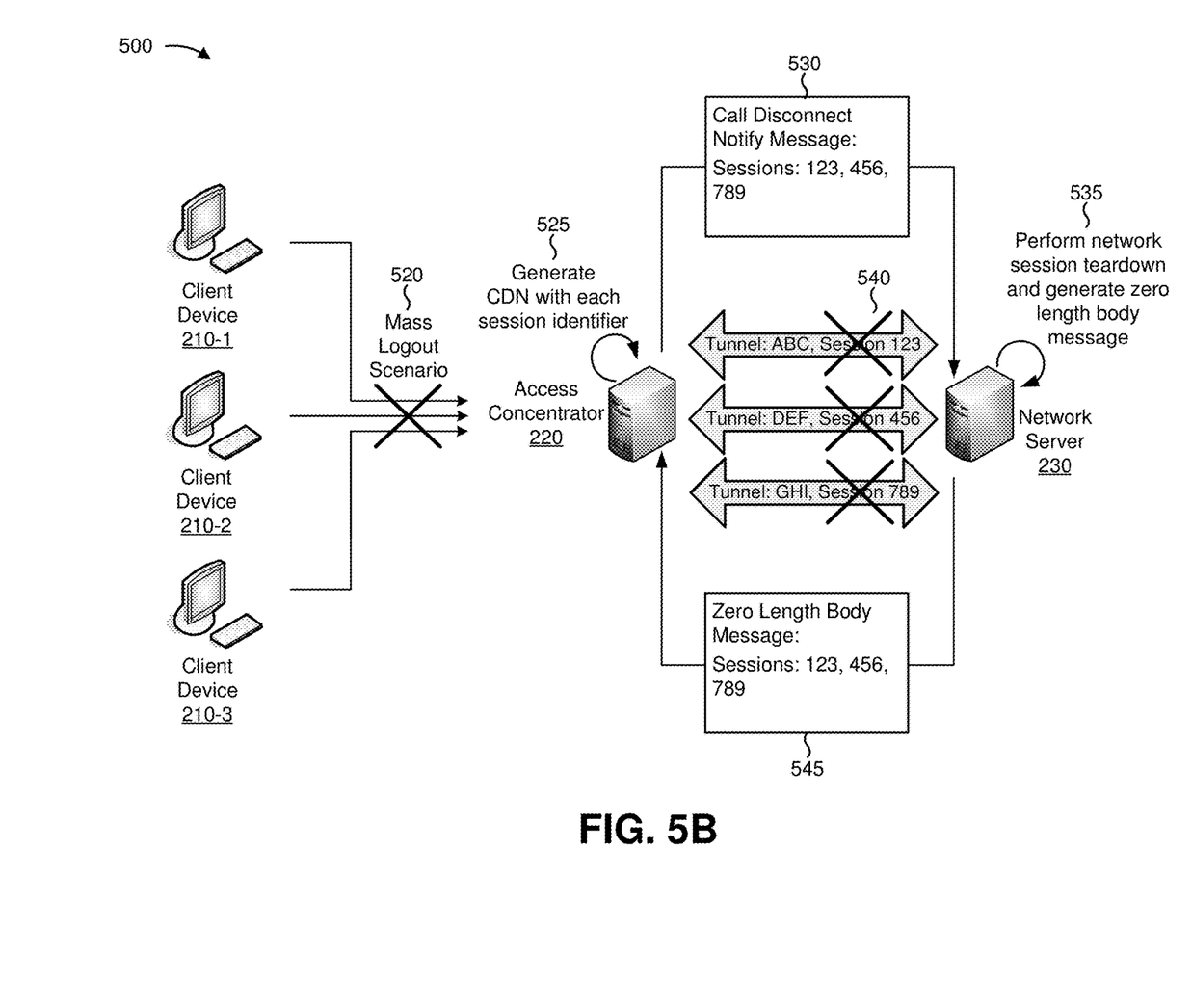
Figure 5C:
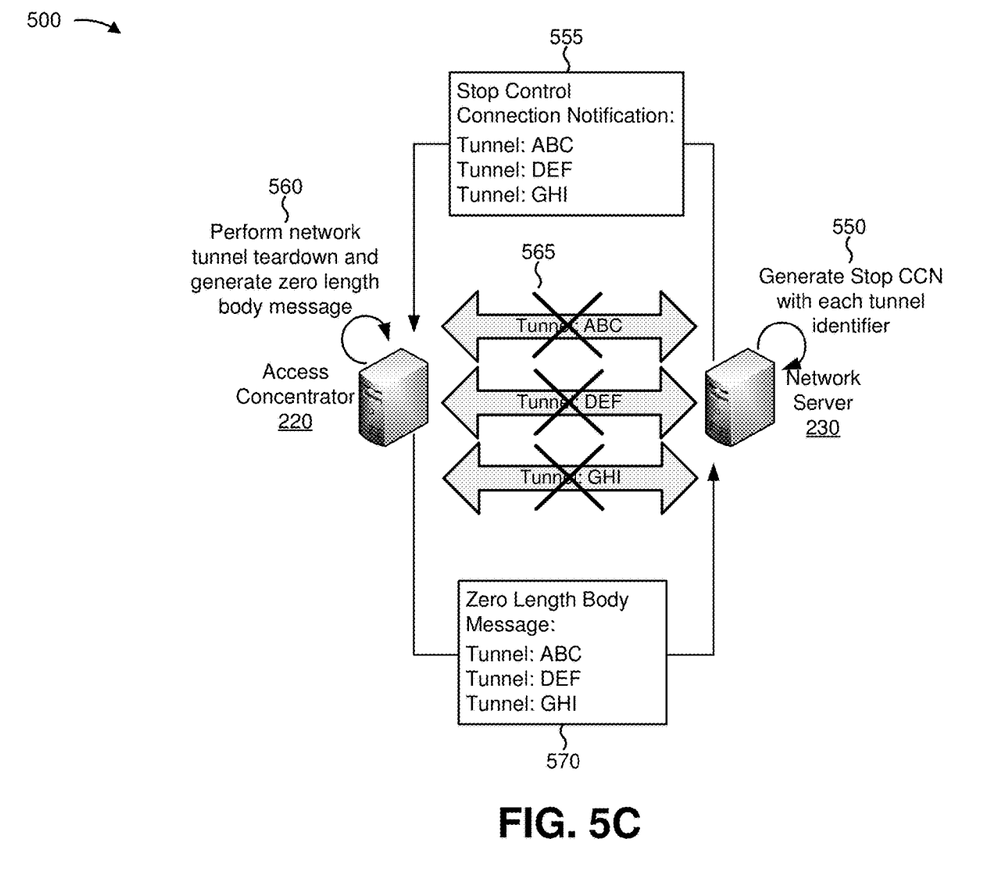

FIGS. 5A-5C are diagrams of an example implementation 500 relating to example process 400 shown in FIG. 4. FIGS. 5A-5C show an example of consolidating teardown messages for network session and/or network tunnel teardown.

As shown in FIG. 5A, access concentrator 220 and network server 230 have established a set of network tunnels and a set of network sessions corresponding to the set of network tunnels. As shown by reference number 505-1, the set of network tunnels includes a first network tunnel associated with a first tunnel identifier (e.g., "ABC") and the set of network sessions includes a first network session associated with a first session identifier (e.g., "123"). As shown by reference number 505-2, the set of network tunnels includes a second network tunnel associated with a second tunnel identifier (e.g., "DEF") and the set of network sessions includes a second network session associated with a second session identifier (e.g., "456"). As shown by reference number 505-3, the set of network tunnels includes a third network tunnel associated with a third tunnel identifier (e.g., "GHI") and the set of network sessions includes a third network session associated with a third session identifier (e.g., "789").

As further shown in FIG. 5A, and by reference number 510, access concentrator 220 directs network traffic that is received from client devices 210-1, 210-2, or 210-3 to network server 230 via a respective network tunnel and network session. As shown by reference number 515, access concentrator 220 directs network traffic to client devices 210-1, 210-2, or 210-3 that is received from network server 230 via a respective network tunnel and network session.

As shown in FIG. 5B, and by reference number 520, client devices 210-1, 210-2, and 210-3 undergo a mass logout scenario (e.g., a service interruption causing a loss of network connectivity to network server 230). As shown by reference number 525, access concentrator 220 generates an L2TP call disconnect notify (CDN) message that includes an AVP identifying the session identifiers associated with the set of sessions. As shown by reference number 530, the L2TP CDN message is transmitted to network server 230 to cause network server 230 to perform a network session teardown. As shown by reference numbers 535 and 540, network server 230 performs a network session teardown based on receiving the L2TP CDN message, and generates an L2TP ZLB acknowledgement message including an AVP identifying the session identifiers associated with the set of sessions. As shown by reference number 545, network server 230 provides the L2TP ZLB acknowledgement message to access concentrator 220 to confirm that the set of network sessions are removed.

As shown in FIG. 5C, and by reference number 550, network server 230 generates an L2TP stop control connection notification (stop CCN) message including an AVP identifying the tunnel identifiers associated with the set of network tunnels. As shown by reference number 555, network server 230 provides the L2TP stop CCN message to access concentrator 220 to cause access concentrator 220 to perform a network tunnel teardown. As shown by reference number 560, access concentrator 220 performs the network tunnel teardown, as shown by reference number 565, and generates an L2TP ZLB acknowledgement message including an AVP identifying the tunnel identifiers associated with the set of network tunnels. As shown by reference number 570, access concentrator 220 provides the L2TP ZLB acknowledgement message to network server 230 to confirm the network tunnel teardown.

As indicated above, FIGS. 5A-5C are provided merely as an example. Other examples are possible and may differ from what was described with regard to FIGS. 5A-5C.

In this way, access concentrator 220 and/or network server 230 reduce a quantity of messages associated with performing teardown by consolidating multiple session identifiers and/or tunnel identifiers into a single message relative to providing the multiple session identifiers and/or tunnel identifiers via multiple messages. Moreover, based on reducing the quantity of messages, access concentrator 220 and/or network server 230 reduce a likelihood of overloading network server 230 with an excess quantity of messages for processing, acknowledgement, or generation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors to:
identify a set of network tunnels or network sessions for which a teardown is to be performed,
the set of network tunnels or network sessions being associated with a set of identifiers,
the set of network tunnels or network sessions being associated with a particular network server;
generate a signaling message associated with causing the teardown to be performed on the set of network tunnels or network sessions, the signaling message including three or more identifiers, of the set of identifiers, that identify at least one of:
a first network tunnel of the set of network tunnels, a second, different network tunnel of the set of network tunnels, and a third, different network tunnel of the set of network tunnels, or
a first network session of the first network tunnel, a second, different network session of the second, different network tunnel, and a third, different network session of the third, different network tunnel;
transmit, to the particular network server, the signaling message to cause the teardown to be performed, concurrently, on three or more network tunnels or network sessions, of the set of network tunnels or network sessions, corresponding to the three or more identifiers,
where the one or more processors, when transmitting the signaling message to the particular network server to cause the teardown to be performed, are to:
transmit, to the particular network server, the signaling message to cause an acknowledgement message to be generated,
the acknowledgement message including the three or more identifiers of the set of identifiers,
the acknowledgement message being associated with confirming that the teardown was performed; and
receive, from the particular network server, the acknowledgement message based on transmitting the signaling message and based on the teardown being performed.

2. The device of claim 1, where the device includes at least one of: a gateway, a router, a modem, a switch, a firewall, a network interface card (NIC), a hub, a bridge, or a server.

3. The device of claim 1, where the one or more processors, when generating the signaling message, are to:
generate the signaling message including the three or more identifiers such that a first quantity of signaling messages that are utilized to signal the teardown for the three or more network tunnels or network sessions is less than a second quantity of signaling messages that are utilized to signal another teardown for another three or more network tunnels or network sessions,
the second quantity of signaling messages being associated with one or more messages for which multiple network tunnels or network sessions are not identified collectively in a single message.

4. The device of claim 1, where the signaling message is a layer 2 tunneling protocol (L2TP) signaling message; and
where the one or more processors, when generating the signaling message, are to:
generate an attribute-value pair (AVP) associated with indicating the three or more identifiers; and
include the AVP in the L2TP signaling message.

5. The device of claim 4, where the particular network server is an L2TP network server, and
where the one or more processors, when transmitting the signaling message to cause the teardown to be performed, are to:
transmit the signaling message to the L2TP network server to cause the L2TP network server to perform a network session teardown on three or more network sessions of the three or more network tunnels or network sessions,
the L2TP network server being associated with identifying the three or more network sessions based on the AVP,
where the acknowledgement message is an L2TP acknowledgement message; and
receive the L2TP acknowledgement message from the L2TP network server,
the L2TP acknowledgement message including another AVP indicating a particular three or more identifiers associated with the three or more network sessions.

6. The device of claim 4, where the one or more processors, when transmitting the signaling message to cause the teardown to be performed, are to:
transmit the signaling message to an L2TP access concentrator to cause the L2TP access concentrator to perform a network tunnel teardown on three or more network tunnels of the three or more network tunnels or network sessions,
the L2TP access concentrator being associated with identifying the three or more network tunnels based on the AVP; and
receive an L2TP acknowledgement message from the L2TP access concentrator, the L2TP acknowledgement message including another AVP indicating a particular three or more identifiers associated with the three or more network tunnels.

7. The device of claim 6, where the signaling message is associated with causing the teardown to be performed on the set of network tunnels; and
where the one or more processors are further to:
receive another signaling message from the L2TP access concentrator,
the other signaling message being an L2TP signaling message including a first AVP identifying the three or more network sessions;
perform a network session teardown based on receiving the other signaling message from the L2TP access concentrator;
transmit another L2TP acknowledgement message to the L2TP access concentrator based on receiving the other signaling message from the L2TP access concentrator,
the other L2TP acknowledgement message including a second AVP identifying the three or more network sessions; and
where the one or more processors, when transmitting the signaling message to the L2TP access concentrator, are further to:
transmit the signaling message to the L2TP access concentrator after performing the network session teardown.

8. A non-transitory computer-readable medium storing instructions, the instructions comprising:
one or more instructions that, when executed by one or more processors, cause the one or more processors to:
establish a plurality of network tunnels, including a corresponding plurality of network sessions, associated with routing network traffic,
where the plurality of network tunnels includes a first network tunnel and a second, different network tunnel,
where the plurality of network sessions includes a first network session of the first network tunnel and a second, different network session of the second, different network tunnel,
the plurality of network tunnels or network sessions being associated with a particular network server;
receive a trigger to perform a teardown of the plurality of network tunnels and the corresponding plurality of network sessions;
generate a single signaling message associated with causing a network session teardown of the plurality of network sessions, concurrently, based on receiving the trigger to perform the teardown of the plurality of network tunnels and the corresponding plurality of network sessions,
the single signaling message identifying each network session of the plurality of network sessions; and
transmit, to the particular network server, the single signaling message to cause the network session teardown of the plurality of network sessions,
where the one or more processors, when transmitting the single signaling message to the particular network server to cause the network session teardown to be performed, are to:
transmit, to the particular network server, the single signaling message to cause an acknowledgement message to be generated,
the acknowledgement message being associated with confirming that the teardown was performed; and
receive, from the particular network server, the acknowledgement message based on transmitting the single signaling message and based on the teardown being performed.

9. The non-transitory computer-readable medium of claim 8, where
the acknowledgement message identifies each network session of the plurality of network sessions, and
wherein the plurality of network sessions includes three or more network sessions.

10. The non-transitory computer-readable medium of claim 8, where the single signaling message is a first signaling message; and
where the one or more instructions, when executed by the one or more processors, further cause the one or more processors to:
receive a second signaling message associated with causing a network tunnel teardown of the plurality of network tunnels based on transmitting the first signaling message to cause the network session teardown of the plurality of network sessions,
the second signaling message identifying each network tunnel of the plurality of network tunnels; and
perform the network tunnel teardown of the plurality of network tunnels based on receiving the second signaling message.

11. The non-transitory computer-readable medium of claim 10, where the one or more instructions, when executed by the one or more processors, further cause the one or more processors to:
generate an acknowledgement message associated with acknowledging receipt of the second signaling message and/or performing the network tunnel teardown of the plurality of network tunnels,
the acknowledgement message identifying each network tunnel of the plurality of network tunnels; and
transmit the acknowledgement message.

12. The non-transitory computer-readable medium of claim 8, where the single signaling message is a layer 2 tunneling protocol (L2TP) signaling message; and
where the one or more instructions, that cause the one or more processors to generate the single signaling message, further cause the one or more processors to:
generate an attribute-value pair (AVP),
the AVP including an attribute portion indicating that a corresponding value portion is associated with identifying network sessions,
the AVP including a value portion identifying each network session of the plurality of network sessions; and
include the AVP in the single signaling message.

13. The non-transitory computer-readable medium of claim 8, where the single signaling message is a layer 2 tunneling protocol (L2TP) signaling message, and
where particular network server is an L2TP network server; and
where the one or more instructions, that cause the one or more processors to transmit the single signaling message, cause the one or more processors to:
transmit the single signaling message to the L2TP network server (LNS),
the LNS being associated with performing the network session teardown.

14. The non-transitory computer-readable medium of claim 8, where the one or more instructions, that cause the one or more processors to receive the trigger, cause the one or more processors to:
    receive information indicating a mass logout scenario for a plurality of client devices associated with the plurality of network tunnels,
        the information indicating the mass logout scenario triggering the teardown of the plurality of network tunnels and the corresponding plurality of network sessions.

15. A method, comprising:
    generating, by a device, a single layer 2 tunneling protocol (L2TP) signaling message associated with causing at least one of:
        a plurality of network tunnel teardowns for a plurality of network tunnels,
            the plurality of network tunnels including a first network tunnel, a second, different network tunnel, and a third, different network tunnel,
            the single L2TP signaling message identifying the plurality of network tunnels, or
        a plurality of network session teardowns for a plurality of network sessions,
            the plurality of network session teardowns or the plurality of network tunnel teardowns being associated with a particular network server,
            the plurality of network sessions including a first network session of the first network tunnel, a second, different network session of the second, different network tunnel, and a third, different network session of the third, different network tunnel, and
            the single L2TP signaling message identifying the plurality of network sessions; and
    transmitting, by the device and to the particular network server, the single L2TP signaling message to cause at least one of:
        the plurality of network tunnel teardowns, or
        the plurality of network session teardowns,
        transmitting the single L2TP signaling message to the particular network server to cause the plurality of network tunnel teardowns or the plurality of network session teardowns to be performed including:
            transmitting, to the particular network server, the single L2TP signaling message to cause an acknowledgement message to be generated,
                the acknowledgement message being associated with confirming that the plurality of network tunnel teardowns or the plurality of network session teardowns were performed; and
            receiving, from the particular network server, the acknowledgement message based on transmitting the signaling message and based on the plurality of network tunnel teardowns or the plurality of network session teardowns being performed.

16. The method of claim 15, further comprising:
    receiving, based on transmitting the single L2TP signaling message to cause the plurality of network session teardowns, another single L2TP signaling message identifying the plurality of network tunnels; and
    performing the plurality of network tunnel teardowns based on receiving the other single L2TP signaling message.

17. The method of claim 15, further comprising:
    receiving information indicating that a plurality of client devices have been disconnected from an L2TP network server (LNS); and
    where transmitting the single L2TP signaling message comprises:
        transmitting the single L2TP signaling message to the LNS to cause the LNS to perform the plurality of network session teardowns.

18. The method of claim 15, where generating the single L2TP signaling message comprises:
    generating an attribute-value pair,
        a value portion of the attribute-value pair including at least one of:
            a plurality of tunnel identifiers identifying the plurality of network tunnels, or
            a plurality of session identifiers identifying the plurality of network sessions; and
    including the attribute-value pair in the single L2TP signaling message.

19. The method of claim 15, further comprising:
    receiving another single L2TP signaling message identifying the plurality of network sessions from an L2TP access concentrator (LAC);
    performing the plurality of network session teardowns based on receiving the other single L2TP signaling message; and
    where transmitting the single L2TP signaling message comprises:
        transmitting the single L2TP signaling message to the LAC to cause the LAC to perform the plurality of network tunnel teardowns.

20. The method of claim 15, further comprising:
    receiving another single L2TP signaling message,
        the other single L2TP signaling message including information identifying at least one of:
            the plurality of network tunnels, or
            the plurality of network sessions; and
    transmitting a single L2TP acknowledgement message based on receiving the other single L2TP signaling message,
        the single L2TP acknowledgement message including information identifying at least one of:
            the plurality of network tunnels, or
            the plurality of network sessions.

\* \* \* \* \*